Aug. 15, 1944.  G. GOEBEL ET AL  2,355,722
ARTICLE HANDLING APPARATUS
Original Filed July 2, 1937   3 Sheets-Sheet 2
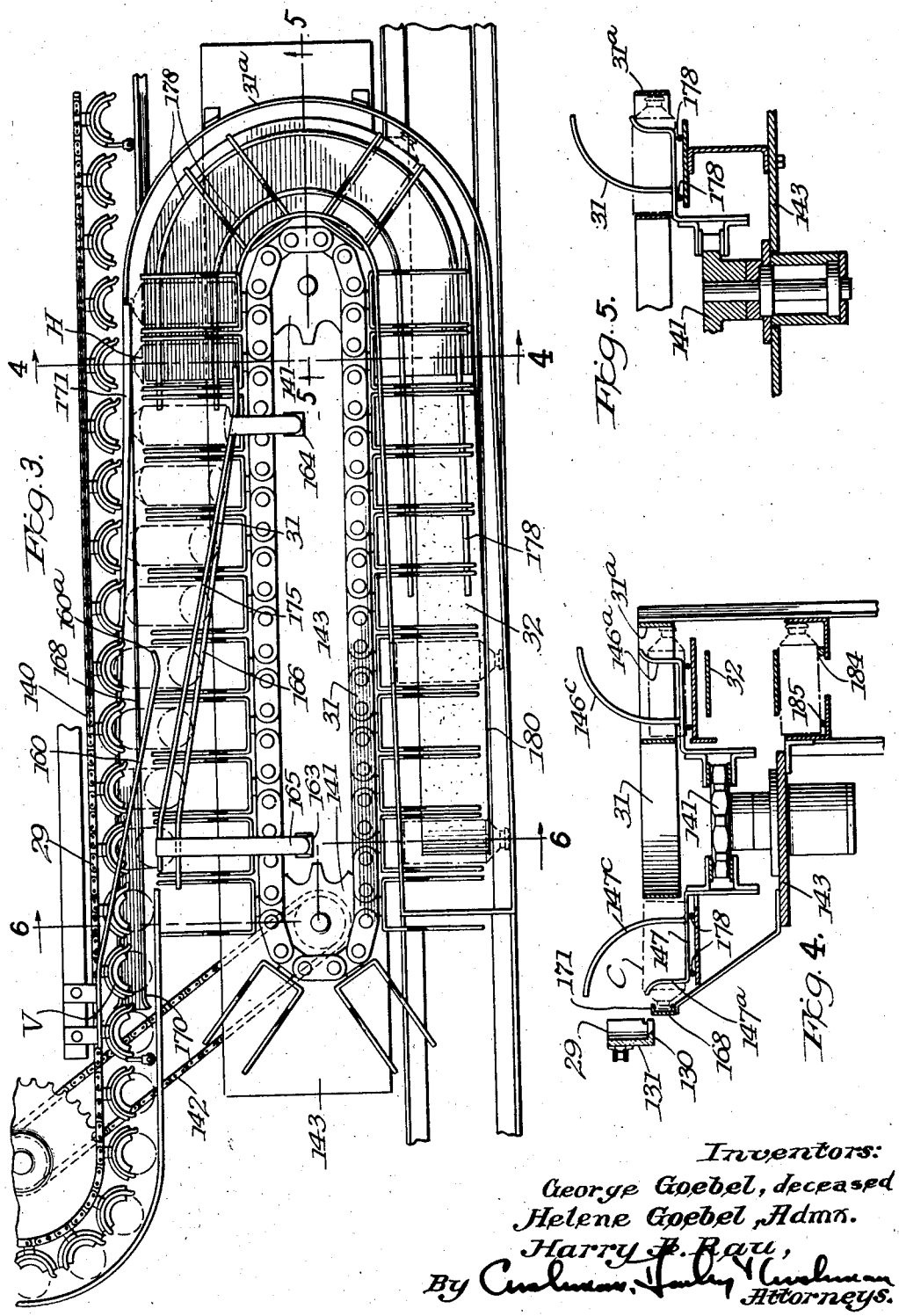
Inventors:
George Goebel, deceased
Helene Goebel, Admn.
Harry P. Rau,
By Cushman, ......, Cushman
Attorneys.

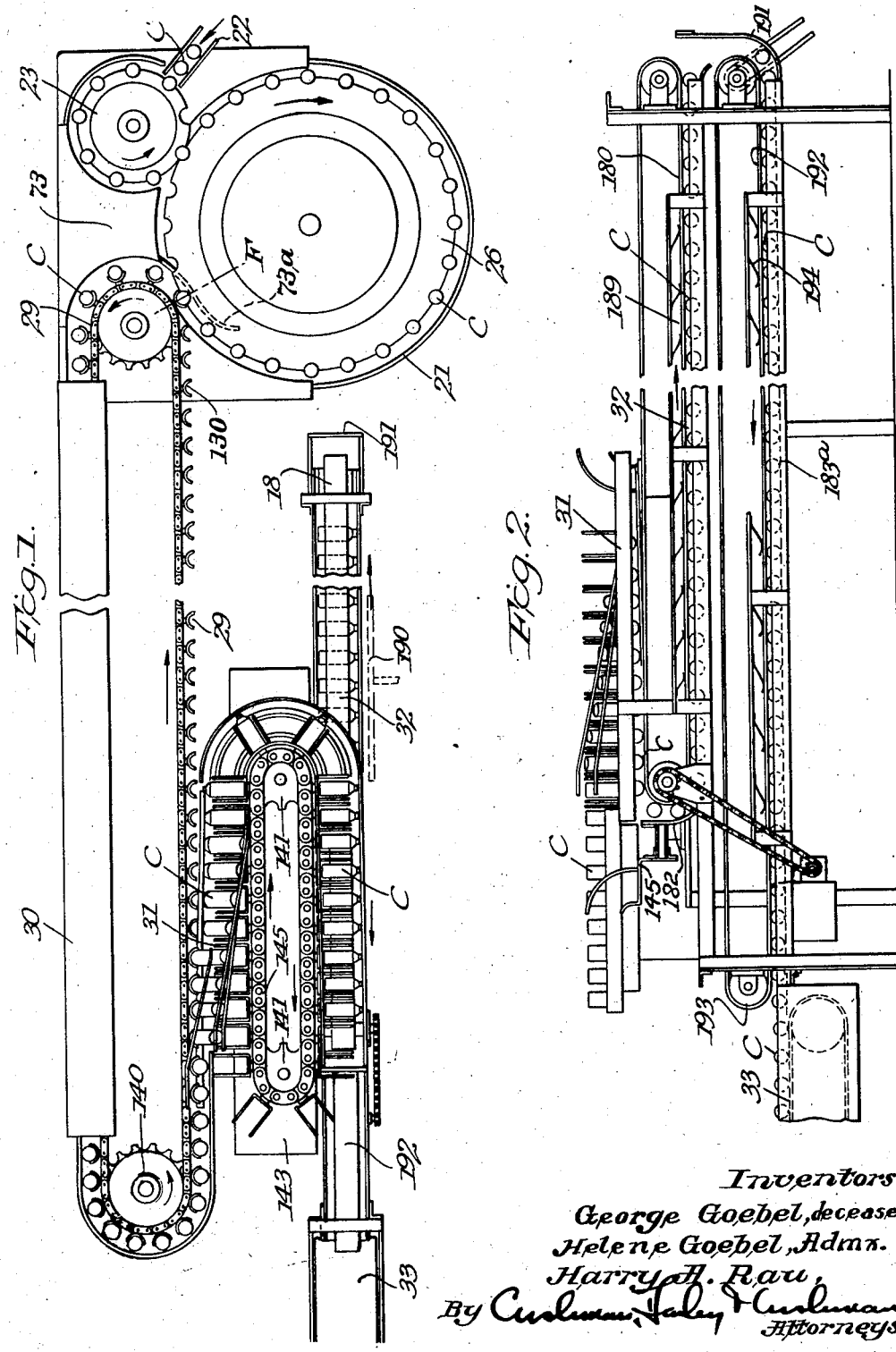

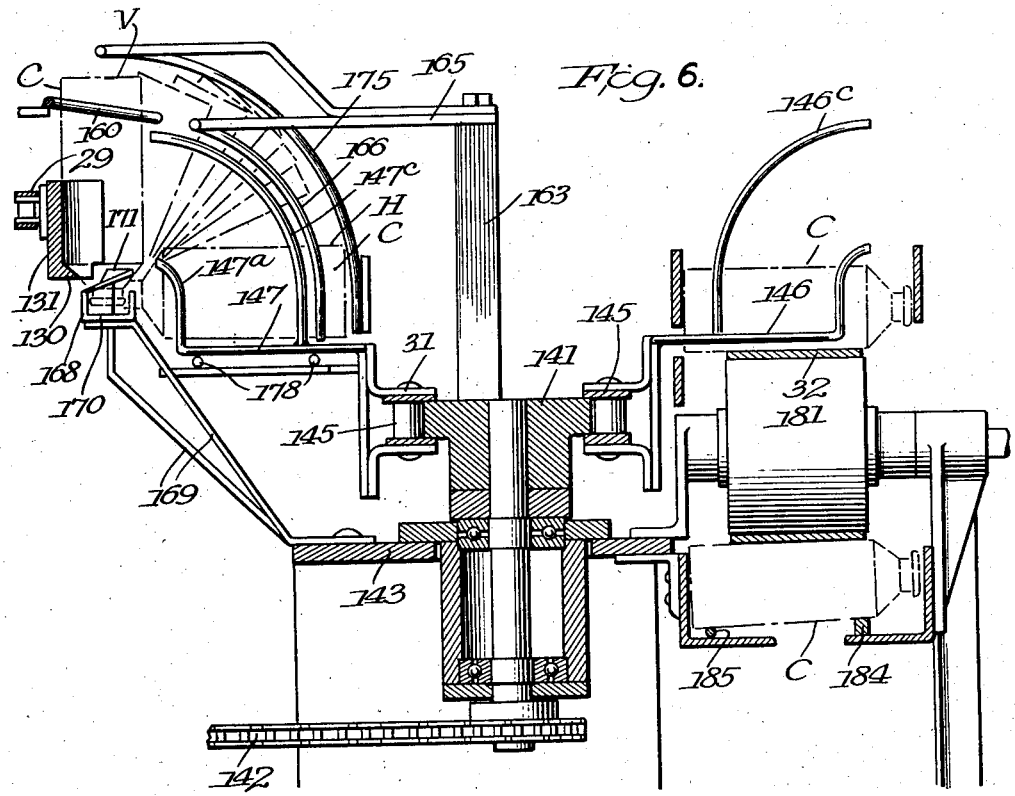
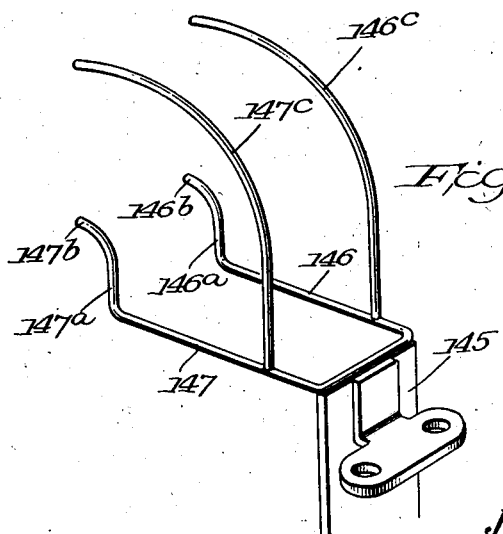

Patented Aug. 15, 1944

2,355,722

UNITED STATES PATENT OFFICE 2,355,722

ARTICLE HANDLING APPARATUS

George Goebel, deceased, late of Baltimore, Md., by Helene Goebel, administratrix, Baltimore, Md., and Harry A. Rau, Baltimore, Md., assignors to Crown Cork & Seal Company, Inc., Baltimore, Md., a corporation of New York Original application July 2, 1937, Serial No. 151,758, now Patent No. 2,257,740, dated October 7, 1941. Divided and this application May 3, 1941, Serial No. 391,804

2 Claims. (Cl. 198—33)

The present invention relates to an article handling apparatus, the application being a division of the application of George Goebel and Harry A. Rau, for Methods and apparatus for coating articles, Serial No. 151,758, filed July 2, 1937, issued October 7, 1941, as Patent No. 2,257,740.

The principal object of the invention is to provide means applicable to article conveyors to support articles during movement upon the conveyor, and also to move the articles from one conveyor to another, all without marring the article or interrupting its movement.

Other objects and advantages of the invention will be apparent from the following specification and accompanying drawings, wherein—

Figure 1 is a general plan view of an apparatus including the present invention.

Figure 2 includes the invention in side elevation.

Figure 3 is a plan view of the invention.

Figure 4 is a vertical sectional view on the line 4—4 of Figure 3.

Figure 5 is a detail vertical sectional view on the line 5—5 of Figure 3.

Figure 6 is a vertical sectional view on the line 6—6 of Figure 3, and

Figure 7 is a perspective view of one of the article guiding frames used in the transfer mechanism of the apparatus.

The apparatus illustrated in the accompanying drawings and the operation thereof may be generally described as follows: Containers or cans C, ordinarily of metal and, with the embodiment of the invention disclosed in the drawings, including a frusto-conical top wall, are moved to the coating mechanism 21 described in detail in said original application by any suitable infeed conveyor, not shown, which delivers the cans to a guideway 22 along which they move in an inverted position to an infeed dial 23. Dial 23 rotates to position successive cans upon can supporting elements spaced about a rotating coating table 26 so that the cans will be coated on their interiors. As indicated in Figure 1, continued rotation of the table 26 will carry the successive cans to a draining conveyor 29 which will conduct them in inverted position through a heated chamber 30 so that any surplus wax may drain therefrom. The cans are removed from conveyor 29 by a transfer mechanism 31 (Figure 1) of the present invention and including an endless conveyor provided with elements which will cause the can to be turned from inverted position to lie in a horizontal plane. The cans move from the transfer mechanism 31 to a drying conveyor 32 and on this latter conveyor the cans are tilted to have their mouths or nozzles slightly raised so that no wax can flow over the lip of the mouth. The drying conveyor 32 moves through a sufficiently long path of travel to enable the wax in the cans to become cool and hard and the cans are subsequently deposited by the conveyor 32 upon a suitable outfeed conveyor 33 from which they may be removed by attendants.

The can which has been placed upon draining conveyor 29 will move into the draining chamber 30 which extends along and encloses the front run of conveyor 29. As best shown in Figures 3 and 6, each link of the conveyor 29 is provided with a carrier 130 which includes an upstanding wall 131 having its inner portion shaped to partially encircle and extend beneath an inverted can to support the same.

In order to transfer the inverted cans from the draining conveyor 29 to the drying conveyor 32 and position them in a substantially horizontal position on the latter conveyor, the cans moving along the inner run of conveyor 29 are engaged by a transfer conveyor 31.

As indicated in Figure 1, the transfer conveyor 31 moves about sprocket wheels 141 and is operated from a suitable source of power through a sprocket chain 142 from a shaft of conveyor 29. The shafts carrying the sprocket wheels are journaled in a base-plate 143 (Figure 6) and the conveyor 31 moves above this plate.

Referring to Figures 6 and 7, each link 145 of transfer conveyor 31 is provided with two spaced and horizontal arms 146 and 147, respectively, arm 146 being the leading arm with respect to the movement of conveyor 31 and arm 147 being the trailing arm. The outer ends of arms 146 and 147 are sharply bent to be upstanding as at 146a and 147a, and then outwardly curving, as indicated at 146b and 147b. The arms 146 and 147 are also respectively provided with outwardly curved and overhanging arms 146c and 147c as best shown in Figure 1, these arms being spaced from the upstanding portions 146a and 147a a distance somewhat less than the length of the body of the cans to be handled. The distance between the leading arm 146 and trailing arm 147 is at least as great as the diameter of the cans to be handled, and the spacing between the overhanging arms 146c and 147c corresponds to that between horizontal arms 146 and 147.

The purpose of the spaced arm structure on each link 145 is to vertically guide the downward movement of the cans from their vertical position shown at position V in Figure 6 to the horizontal position shown at H in the same figure. A can is caused to move from the first of these positions to the latter position by contact of the inner side (the left-hand side in Figure 6) of a can at position V on the draining conveyor 29 with a rod 160 which, as indicated in Figures 3 and 6, is downwardly and outwardly inclined with respect to the inner run of conveyor 29 so that as the cans move along the rod 160 they will fall or be brushed outwardly from the conveyor 29 and between the arm structures on each of the links 145 of the transfer conveyor 31.

The base plate 143 of the transfer conveyor 31 has an upstanding post 163 secured thereto adjacent the end at which cans are received from draining conveyor 29, and a post 164 is secured to the base plate adjacent the other end of the conveyor. As shown in Figure 6, post 163 is provided with an arm 165 extending outwardly over the arm structures on the links 145, the outer end of this arm being so formed and positioned that a can contacting with the rod 160 will be received and supported and gradually permitted to drop over from position V to position H. In order to accommodate this movement of the can, the receiving rod 166 extends substantially parallel to the pusher rod 160, but is also bowed downwardly with respect to rod 160 as best indicated in Figure 6. It will be noted from Figure 3 that the receiving arm 166 extends somewhat past the free end 160a of pusher arm 160. Obviously, after a can has been tilted sufficiently far outwardly from the conveyor 29 by pusher rod 160, it will rest directly upon the receiving rod 166 so that the latter rod will entirely control its further movement toward the horizontal, and pusher rod 160 therefore need only be sufficiently long to tilt the can to lie upon the receiving rod 166.

The movement of the cans from position V to position H is also assisted by a U-shaped guide-bar or track 168 provided beneath the run of draining conveyor 29 adjacent the transfer conveyor 31. As shown in Figure 6, guide-bar 168 is supported upon arms 169 extending from the base plate of transfer conveyor 31, and the nozzles of the cans C move in the guide-bar. The infeed end 170 of the guide-bar faces upwardly as illustrated in Figures 3 and 6, but the guide-bar is twisted longitudinally so that at its outfeed end 171 it lies in a vertical plane as shown in Figures 3 and 6. Since the necks of the cans will be moving in the guide-bar 168, the entire can will thereby be urged from vertical position to horizontal position. It will be observed that shortly after a can has moved from position V in Figures 3 and 6 its shoulder will move out of contact with the carrier 131 of draining conveyor 29 and that from this point onward the can will be bodily supported by the guide-bar 168 and the receiving rod 166.

In order to prevent cans from being thrown bodily outward from the guide-bar 168, a can end engaging rod 175 is also supported by the post 163, the rod 175 substantially conforming in longitudinal outline to the receiving rod 166, but being positioned above the latter rod as best indicated in Figure 6, so that the closed ends of the cans will contact therewith during their movement from position V to position H.

The movement of transfer conveyor 31 is so synchronized with the movement of draining conveyor 29 that during the operation of the conveyor, a link 145 of the transfer conveyor will be aligned with each carrier link 130 of conveyor 29. As a result, a can pushed from a carrier link of conveyor 29 by pusher rod 160 will move between the overhanging arms 146c and 147c of a link 145 on the transfer conveyor. When the can has swung so far outwardly from the carrier link 130 that is out of contact with such carriers, it will be moved forwardly by the trailing arms 147 and 147c of the arm structure of the aligned link 145. Thus, the can will be moving forwardly and with the conveyors during the entire time that it is being moved from vertical to horizontal position.

When the can reaches position H it will be received upon horizontal bars 178, which, as shown in Figure 3, extend beneath the path of travel of the arms of the links 145. From this point the trailing arms 147b and 147c will cause the cans to roll on the bars 178 and about the right-hand end (Figure 3) of the path of transfer conveyor 31 and along the inner run of that conveyor, the cans being held in the carriers of conveyor 31 by a guide plate 31a. As best shown in Figure 3, the bars 178 terminate approximately midway of the inner run (the run at the bottom of Figure 3) of transfer conveyor 31 and when the cans have reached the ends of the bars 178 they will drop very slightly downwardly between the arms of link 145 to lie upon and move with a conveyor belt 180. The adjacent end of conveyor belt 180 moves down about a pulley 181 and the cans are guided downwardly and about the pulley by a chute or guide 182 preferably formed of leather, canvas, or similar heavy but relatively flexible material.

The chute 182 terminates beneath the pulley and from this point onward the cans move on a trackway formed of spaced bars 184 and 185, bar 185, beneath the closed or bottom end of the can, being of less height than the bar 184. The lower run of belt 180 will bear upon the upper surfaces of the cans to roll them along the two strips. As best shown in Figure 6, the use of higher bars 184 beneath the nozzle ends of the cans will cause the mouths of the cans to be slightly raised, this arrangement insuring that such surplus wax as may be still in the can will flow to its closed and lower end so that no wax may flow over the lip of the can.

Spaced and facing angle irons shown in Figure 6 guide the can along the strips 184 and 185 and, at spaced points, brackets extend upwardly from the angle irons, these brackets serving to support longitudinally extending bars having leaf springs 189 secured to their under sides, the leaf springs extending parallel with the lower run of belt 180 and in the direction of its travel to exert a slight pressure upon the belt to hold it in contact with the upper surfaces of the cans.

As shown in Figure 1, a gas burner 190 may be positioned adjacent the portion of the trackway formed of strips 184 and 185 upon which the cans are first received, the burner also being positioned near the nozzle ends of the cans. The purpose of this heating means is to cause any surplus wax in the mouth of the can to be melted so that it will flow back into the body of the can. However, burner 190 only extends along the trackway for a comparatively short distance, and through the remainder and the greater part of the movement of cans on such trackway, they will be permitted to cool so that the wax will harden while the cans are still slightly tilted.

Referring to Figures 1 and 2, it will be noted that as the cans move from beneath the lower run of belt 180 they will drop downwardly through a chute 191 and will then move beneath the lower run of an endless belt 192 to the outfeed end 193 of the apparatus. The lower run of belt 192 is pressed downwardly upon the upper surfaces of the cans by leaf springs 194 mounted in a manner similar to the leaf springs 189 of belt 180, and the cans move upon a trackway 183a so that the nozzles of the cans will be slightly raised in a manner similar to that shown in Figure 6. At the outfeed end 193 of the machine the cans move upon a conveyor 33 from which they may be removed by attendants.

It will be obvious from the foregoing description of the apparatus set forth in the drawings that the invention is applicable for the handling of articles of numerous types and that the description herein of the construction and use of an apparatus for coating the interiors of containers is merely to illustrate and disclose one embodiment of the apparatus and method of the invention.

We claim:

1. In combination, a conveyor including moving article carriers each adapted to support an elongated article with its longitudinal axis substantially vertical, a second conveyor adapted to support the articles with their longitudinal axes substantially horizontal, said second conveyor including article engaging members movable along a run parallel to a run of said first conveyor and with said article engaging members moving in register with the article carriers of said first conveyor, each of said article engaging members including a pair of spaced arms extending toward said article carriers, said arms being spaced a distance corresponding to the width of the article so that an article may move between the same without tilting longitudinally of said runs, and fixed means to engage the articles to cause them to tilt transversely of said runs of the conveyors to drop between said arms, said last named means including an element to embrace the lowermost portion of each article and spiraled longitudinally of said runs.

2. In combination, a conveyor including moving article carriers each adapted to support an elongated article with its longitudinal axis substantially vertical, a second conveyor adapted to support the articles with their longitudinal axes substantially horizontal, said second conveyor including article engaging members movable along a run parallel to a run of said first conveyor and with said article engaging members moving in register with the article carriers of said first conveyor, each of said article engaging members including a pair of spaced arms extending toward said article carriers, said arms being spaced a distance corresponding to the width of the article so that an article may move between the same without tilting longitudinally of said runs, and fixed means to engage the articles to cause them to tilt transversely of said runs of the conveyors to drop between said arms, said last named means including an element to embrace the lowermost portion of each article and spiraled longitudinally of said runs, and elements inclined longitudinally of said runs and spaced from said last-named element by a distance substantially corresponding to the length of each article so that they will engage a portion of the article spaced from the portion engaged by said last-named element.

HELENE GOEBEL,
*Administratrix of the Estate of George Goebel, Deceased.*

HARRY A. RAU.